(12) United States Patent (10) Patent No.: US 12,664,682 B2
Uno (45) Date of Patent: Jun. 23, 2026

(54) AUTONOMOUS TRAVELING VEHICLE, DEVICE FOR CONTROLLING AUTONOMOUS TRAVELING VEHICLE, AND OWN-POSITION ESTIMATING METHOD FOR AUTONOMOUS TRAVELING VEHICLE

(71) Applicant: KABUSHIKI KAISHA TOYOTA JIDOSHOKKI, Aichi-ken (JP)

(72) Inventor: Takashi Uno, Kariya (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 130 days.

(21) Appl. No.: 18/703,460

(22) PCT Filed: Oct. 24, 2022

(86) PCT No.: PCT/JP2022/039590
§ 371 (c)(1),
(2) Date: Apr. 22, 2024

(87) PCT Pub. No.: WO2023/074644
PCT Pub. Date: May 4, 2023

(65) Prior Publication Data
US 2024/0428451 A1 Dec. 26, 2024

(30) Foreign Application Priority Data
Oct. 29, 2021 (JP) ................................. 2021-177751

(51) Int. Cl.
*G06T 7/73* (2017.01)
*B60W 60/00* (2020.01)

(52) U.S. Cl.
CPC ............. *G06T 7/74* (2017.01); *B60W 60/001* (2020.02); *B60W 2420/403* (2013.01); *G06T 2207/30252* (2013.01)

(58) Field of Classification Search
CPC ........... G06T 7/74; G06T 2207/30252; B60W 60/001; B60W 2420/403; G01C 21/3602;
(Continued)

(56) References Cited

U.S. PATENT DOCUMENTS 8,725,413 B2 5/2014 Kozak et al.
2014/0005932 A1* 1/2014 Kozak .................... G01C 21/30
701/446
(Continued)

OTHER PUBLICATIONS

Bürki Mathias: "Efficient Visual Localization for Ground Vehicles in Outdoor Environments", Oct. 1, 2019 (Oct. 1, 2019), pp. 1-154, XP055868605, DOI: 10.3929/ethz-b-000372042, retrieved from the Internet: URL: https://www.research--collection.ethz.ch/bitstream/handle/20.500.11850/372042/phd_thesis_mathias_buerki_final_submission.pdf?sequence=1&isAllowed=y [retrieved on Dec. 2, 2021].
(Continued)

*Primary Examiner* — Brandon D Lee
(74) *Attorney, Agent, or Firm* — Greenblum & Bernstein, P.L.C.

(57) ABSTRACT

An autonomous traveling vehicle performs data alignment processing, priority order setting processing, identification processing, image matching processing, and own-position estimation processing. The data alignment processing rearranges a plurality of map data into a prescribed order. The identification processing identifies, as an identified group, a group that includes map image data that is most similar to image data when a prescribed condition is satisfied after the data alignment processing. The priority order setting processing further rearranges the plurality of map data rearranged by the data alignment processing, so that the map data belonging to the identified group is used preferentially in the image matching processing.

7 Claims, 7 Drawing Sheets

(58) Field of Classification Search
CPC ...... G01C 21/30; G05D 1/243; G05D 1/2462;
G05D 2107/13; G05D 2109/10; G05D
2111/10
See application file for complete search history.

(56) References Cited

U.S. PATENT DOCUMENTS

2021/0018323 A1* 1/2021 Freedman .......... G01C 21/3461
2023/0097592 A1* 3/2023 Feng ................... G06V 10/751
382/100

OTHER PUBLICATIONS

International Search Report Issued in international Patent Application No. PCT/JP2022/039590, dated Jan. 10, 2023, along with an English translation thereof.

* cited by examiner

START

Image data acquiring process ~S1

Imaging process ~S2

Map dataset extracting process ~S3

Dataset arranging process ~S4

~S5
Predetermined condition satisfied?
YES
NO

Specifying process ~S7

Priority order setting process ~S6

Image matching process ~S8

Position estimating process ~S9

END

1st Group G1　(Datasets No.1-No.◯)
2nd Group G2　(Datasets No.21-No.☐)
⋮
nth Group Gn　(Datasets No.★ - No.△)

IM12

IM11
2nd Group G2, Dataset No.21

CP2

CP1

IM11
1st Group G1, Dataset No.1

CP1

IM11
3rd Group G3, Dataset No.31

CP1

IM11
1st Group G1, Dataset No.2

CP1

IM11
2nd Group G2, Dataset No.21

CP1

CP2    L    IM12

AUTONOMOUS TRAVELING VEHICLE, DEVICE FOR CONTROLLING AUTONOMOUS TRAVELING VEHICLE, AND OWN-POSITION ESTIMATING METHOD FOR AUTONOMOUS TRAVELING VEHICLE

CROSS REFERENCE TO RELATED APPLICATIONS

This application is a National Stage of International Application No. PCT/JP2022/039590 filed on Oct. 24, 2022, that claims priority to Japanese Patent Application No. 2021-177751 filed on Oct. 29, 2021, both of which are incorporated herein by reference in their entirety including the specification, claims, drawings, and abstract.

TECHNICAL FIELD

The present disclosure relates to an autonomous vehicle, a controller for an autonomous vehicle, and a method for estimating a position of an autonomous vehicle.

BACKGROUND ART

Patent Literature 1 describes an autonomous vehicle including a camera, a storage device, and a controller. The camera captures images of a road surface or the like at predetermined time intervals. The storage device stores map datasets. The map datasets are datasets that associates position information with map image datasets.

The controller estimates the position of the autonomous vehicle in predetermined time intervals. When estimating the position, the controller acquires image data from the camera. The controller executes an image matching process to compare the acquired image data with the map image datasets stored in the storage device. The controller specifies the map image dataset corresponding to the image data through the image matching process. The controller estimates its position based on the relative positional relationship between the specified map image dataset and the image data, and the relative angle between the specified map image dataset and the image data.

CITATION LIST

Patent Literature

Patent Literature 1: U.S. Pat. No. 8,725,413

SUMMARY OF INVENTION

Technical Problem

When the image matching process uses the map image datasets of every one of the map datasets stored in the storage device, the processing time of the image matching process will become long. To shorten the processing time, the number of the map image datasets that are used may be reduced. In such a case, the order in which the map datasets are arranged is changed. The arrangement of the map datasets is changed in order from map datasets including position information that is closer to the position information of the autonomous vehicle, which was estimated a predetermined time before execution of the image matching process. The image matching process is sequentially executed on only a predetermined number of map datasets from the map dataset at the head of the arrangement order.

Even when the arrangement order of the map datasets is changed, the image-capturing environment of the image data may differ from the image-capturing environment of the map image dataset. This may lower the position estimation accuracy of the autonomous vehicle.

Solution to Problem

An autonomous vehicle according to one aspect of the present disclosure is configured to travel while estimating its own position. The autonomous vehicle includes a camera configured to image-capture an imaging subject in predetermined time intervals, a storage device configured to store map datasets including position information associated with map image datasets acquired by image-capturing the imaging subject in advance, an acquisition unit configured to acquire image data from the camera, a position estimation unit configured to execute, in the predetermined intervals, an image matching process that compares the image data with the map image datasets to specify a map image dataset corresponding to the image data and configured to execute a position estimating process that estimates the position of the autonomous vehicle from a relative positional relationship of the specified map image dataset and the image data and from a relative angle of the specified map image dataset and the image data, and a processor. The map datasets are divided into groups in accordance with a state of the imaging subject. The processor is configured to execute a dataset arranging process for changing an arrangement order of the map datasets to a predetermined arrangement order, a specifying process for comparing the image data with the map image datasets included in each of the groups when a predetermined condition is satisfied subsequent to the dataset arranging process to specify a group including a map image dataset that is most similar to the image data as a specified group, and a priority order setting process for further changing the arrangement order of the map datasets that was changed by the dataset arranging process so that the map datasets belonging to the specified group are given priority for use in the image matching process. The image matching process includes comparing the image data with only a predetermined number of the map datasets from a head of the arrangement order subsequent to the priority order setting process and in order from the head of the arrangement order.

A controller of an autonomous vehicle in accordance with one aspect of the present disclosure is configured to control the autonomous vehicle that travels while estimating its own position. The controller includes an acquisition unit configured to acquire image data from a camera that image-captures an imaging subject in predetermined time intervals, a position estimation unit configured to execute, in the predetermined intervals, an image matching process that compares the image data with map image datasets, included in map datasets including position information associated with map image datasets acquired by image-capturing the imaging subject in advance, to specify a map image dataset corresponding to the image data and configured to execute a position estimating process that estimates the position of the autonomous vehicle from a relative positional relationship of the specified map image dataset and the image data and from a relative angle of the specified map image dataset and the image data. The map datasets are divided into groups in accordance with a state of the imaging subject. The controller is configured to execute a dataset arranging process for changing an arrangement order of the map datasets to a predetermined arrangement order, a specifying process for comparing the image data with the map image datasets included in each of the groups when a predetermined condition is satisfied subsequent to the dataset arranging process to specify a group including a map image dataset that is most similar to the image data as a specified group, and a priority order setting process for further changing the arrangement order of the map datasets that was changed by the dataset arranging process so that the map datasets belonging to the specified group are given priority for use in the image matching process. The image matching process includes comparing the image data with only a predetermined number of the map datasets from a head of the arrangement order subsequent to the priority order setting process and in order from the head of the arrangement order.

A method for estimating a position of an autonomous vehicle according to one aspect of the present disclosure includes image-capturing an imaging subject in predetermined time intervals, storing map datasets including information associated with map image datasets acquired by image-capturing the imaging subject in advance, acquiring image data from the camera, executing, in the predetermined intervals, an image matching process for comparing the image data with the map image datasets to specify a map image dataset corresponding to the image data, executing a position estimating process for estimating the position of the autonomous vehicle from a relative positional relationship of the specified map image dataset and the image data and from a relative angle of the specified map image dataset and the image data. The map datasets are divided into groups in accordance with a state of the imaging subject. The method further includes executing a dataset arranging process for changing an arrangement order of the map datasets to a predetermined arrangement order, executing a specifying process for comparing the image data with the map image datasets included in each of the groups when a predetermined condition is satisfied subsequent to the dataset arranging process to specify a group including a map image dataset that is most similar to the image data as a specified group, and executing a priority order setting process for further changing the arrangement order of the map datasets that has been changed by the dataset arranging process so that the map datasets belonging to the specified group are given priority for use in the image matching process. The image matching process includes comparing the image data with only a predetermined number of the map datasets from a head of the arrangement order subsequent to the priority order setting process and in order from the head of the arrangement order.

DESCRIPTION OF EMBODIMENTS

One embodiment of an autonomous vehicle and a controller for an autonomous vehicle will now be described with reference to FIGS. 1 to 10.

Configuration of Autonomous Vehicle

Figure 1:
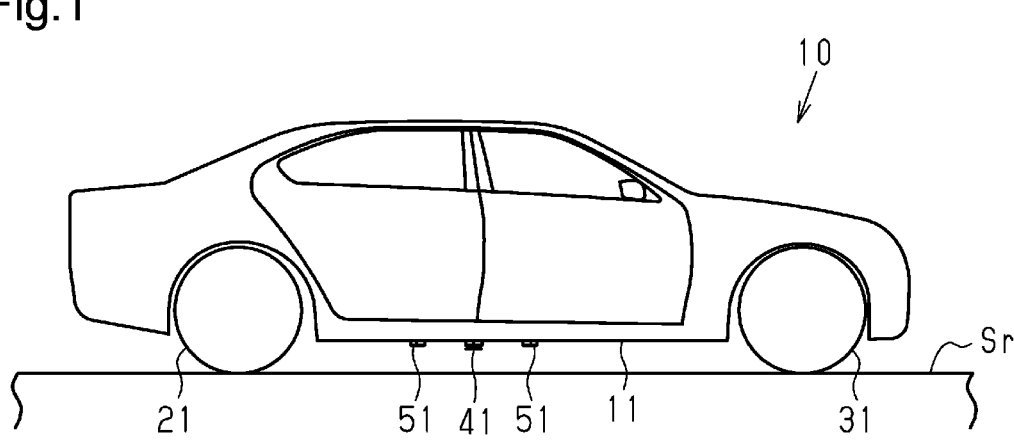
FIG. 1 is a side view of an autonomous vehicle.
Figure 2:
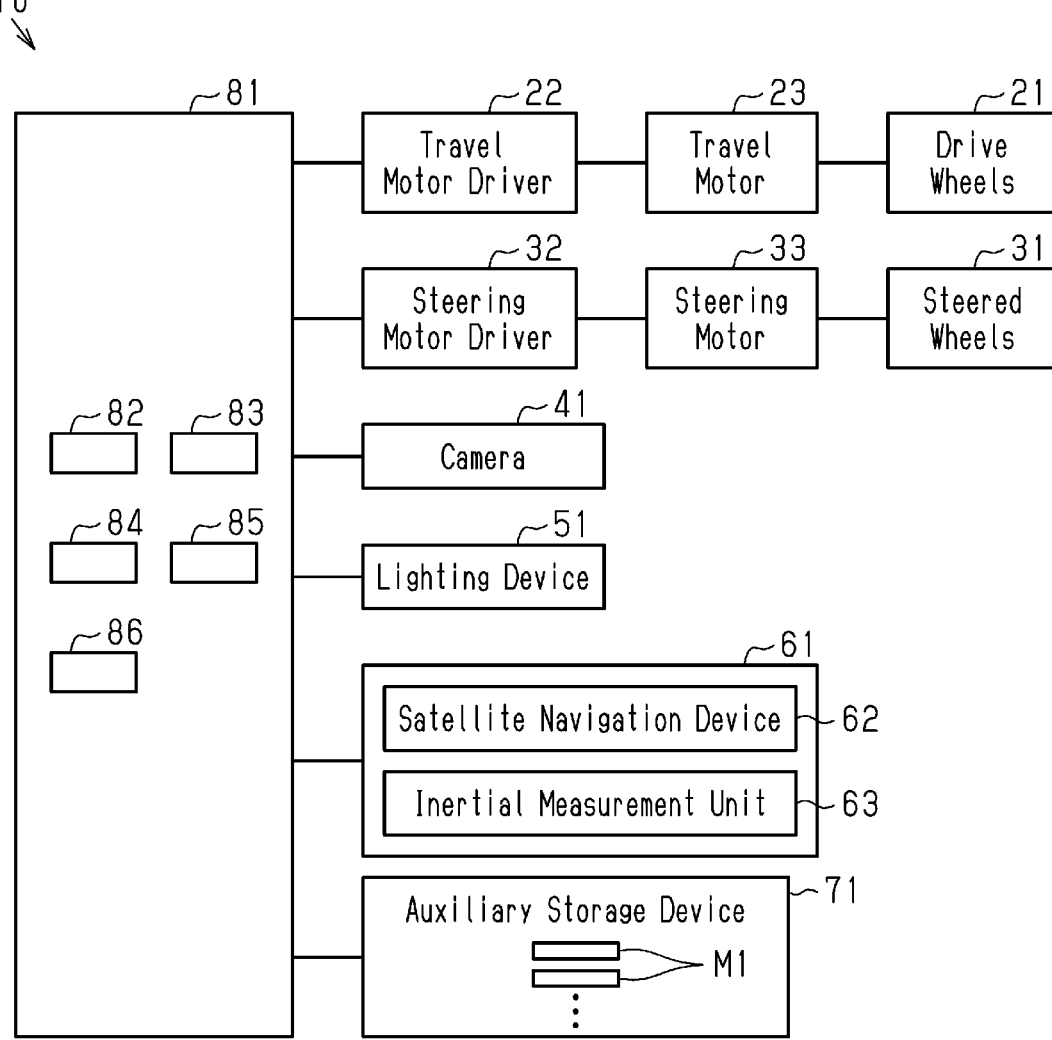
FIG. 2 is a block diagram showing the configuration of the autonomous vehicle illustrated in FIG. 1.

As shown in FIGS. 1 and 2, an autonomous vehicle 10 includes a vehicle body 11, drive wheels 21, and steered wheels 31. The autonomous vehicle 10 includes a travel motor driver 22, a travel motor 23, a steering motor driver 32, and a steering motor 33. The autonomous vehicle 10 includes a camera 41, a lighting device 51, a positioning measurement device 61, a controller 81, and an auxiliary storage device 71. The autonomous vehicle 10 may be an automobile or an industrial vehicle. An industrial vehicle includes a forklift, a towing tractor, and an automated guided vehicle.

The travel motor 23 is a motor that rotates the drive wheels 21. The travel motor driver 22 drives the travel motor 23 in accordance with an instruction from the controller 81. The travel motor 23 drives and rotates the drive wheels 21 to move the autonomous vehicle 10. The steering motor 33 is a motor that steers the steered wheels 31. The steering motor driver 32 drives the steering motor 33 in accordance with an instruction from the controller 81. The steering motor 33 drives and steers the steered wheels 31 to turn the autonomous vehicle 10.

Configuration of Camera

The camera 41 is a digital camera. The camera 41 includes an image-capturing element. Examples of an image capturing element include a charge-coupled (CCD) image sensor and a complementary metal-oxide semiconductor (CMOS) image sensor. Examples of the camera 41 include an RGB camera, an infrared camera, a grayscale camera, and a visible light camera.

The camera 41 captures images in predetermined time intervals to generate image data. The image data is digital data of an image captured by the camera 41. The predetermined time is, for example, 0.1 seconds.

The camera 41 is arranged to capture images of a road surface Sr. The camera 41 is arranged on the bottom of the vehicle body 11 oriented in the vertical direction. The camera 41 is arranged so that an optical axis of the camera 41 extends in the vertical direction. A state in which the camera 41 is oriented in the vertical direction allows for errors resulting from the attachment accuracy of the camera 41. In other words, the camera 41 may be attached in a state oriented in a direction that slightly differs from the vertical direction.

Figure 4:
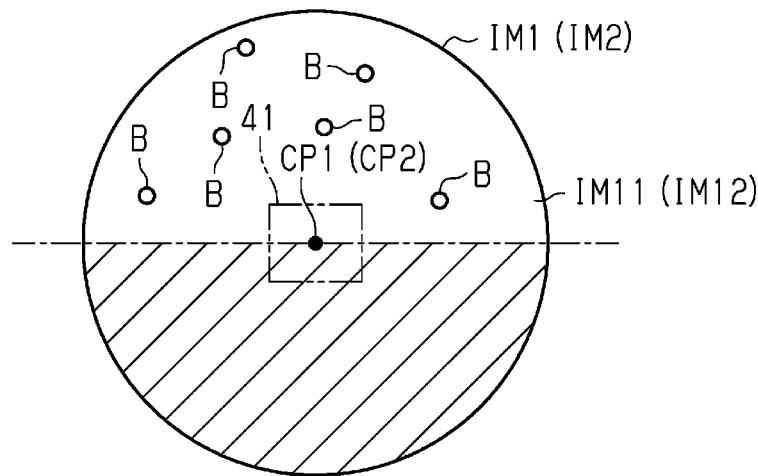
FIG. 4 is a diagram illustrating an imaging process executed by the controller of FIG. 2.

The camera 41 generates image data indicating an image of the road surface Sr that is an imaging subject. One example of the image data is image data IM1, which is circular as shown in FIG. 4. The image data IM1 includes features B of the road surface Sr. The features of the road surface Sr are, for example, in the irregularity of the road surface Sr. FIG. 4 schematically shows features B of the road surface Sr. Features B of the road surface Sr shown in FIG.
4 change in accordance with where the autonomous vehicle
10 is traveling.

Configuration of Lighting Device

The lighting device 51 is arranged to light the road surface
Sr. The lighting device 51 lights the road surface Sr over a
range that is image-captured by the camera 41. The lighting
device 51 is arranged on the bottom of the vehicle body 11
in a state oriented in a downward direction. The lighting
device 51 may be, for example, a light-emitting diode.

Configuration of Positioning Measurement Device.

The positioning measurement device 61 includes a satel-
lite navigation device 62 and an inertial measurement device
63. The satellite navigation device 62 measures positions by
using satellite signals transmitted from Global Navigation
Satellite System (GNSS) satellites. The inertial measure-
ment device 63 includes a gyroscope sensor and an accel-
eration sensor. The positioning measurement device 61 can
acquire the position information of the autonomous vehicle
10. The position information can be calculated from, for
example, the latitude and longitude acquired by the satellite
navigation device 62 and the movement amount of the
autonomous vehicle 10 calculated by the inertial measure-
ment device 63.

Configuration of Auxiliary Storage Device

The auxiliary storage device 71 stores information that is
readable by the controller 81. Examples of the auxiliary
storage device 71 include a hard disk drive, a solid state
drive, and a flash memory.

The auxiliary storage device 71 stores map datasets M1.
The map datasets M1 associates position information with
map image datasets of the road surface Sr that is image-
captured in advance. The position information includes
coordinate information and orientation information. The
coordinate information refers to coordinates in a map coor-
dinate system, which is a coordinate system representing
absolute positions. The map coordinate system may be an
orthogonal coordinate system or a geographical coordinate
system. The orientation information is information indicat-
ing inclination with respect to a coordinate axis of the map
coordinate system. The auxiliary storage device 71 is a
storage device storing the map datasets M1.

Configuration of Autonomous Vehicle Controller

The controller 81 includes a processor 82 and storage 83.
Examples of the processor 82 include, for example, a central
processing unit (CPU), a graphics processing unit (GPU),
and a digital signal processor (DSP). The storage 83 includes
a random access memory (RAM) and a read only memory
(ROM). The storage 83 stores program codes or instructions
configured to have the processor 82 execute processes. The
storage 83, or the computer-readable medium, includes any
available medium that is accessible with a versatile or
dedicated computer. The controller 81 may be configured by
hardware circuitry such as an application specific integrated
circuit (ASIC) or a field programmable gate array. The
controller 81, which is processing circuitry, may be one or
more processors operated by computer programs, hardware
circuitry of one or more of an ASIC, an FPGA, or the like,
or a combination of these elements.

The controller 81 controls the autonomous vehicle 10 that
travels while estimating its own position. The controller 81
includes an acquisition unit 84, a map generation unit 85,
and a position estimation unit 86. The acquisition unit 84,
the map generation unit 85, and the position estimation unit
86 are functional elements that function when the controller
81 executes predetermined programs. The autonomous
vehicle 10 may include the acquisition unit 84, the map generation unit 85, and the position estimation unit 86 as
devices that are separate from the controller 81.

The acquisition unit 84 acquires image data from the
camera 41. The acquisition unit 84 outputs the acquired
image data to the map generation unit 85.

The map generation unit 85 executes a map generation
process. The map generation process is a process for gen-
erating, in advance, the map datasets M1 stored in the
auxiliary storage device 71. The map datasets M1 may be
acquired, for example, when the autonomous vehicle 10 is
driven in advance at locations where the autonomous vehicle
10 is expected to travel. The map datasets M1 are generated
by driving the autonomous vehicle 10 a number of times at
a location where it is expected to travel. The map datasets
M1 are generated for each state of the road surface Sr at the
location. The state of the road surface Sr is, for example, the
state of irregularities in the road surface Sr during rainfall,
the state of the irregularities of the road surface Sr under
clear skies, the state of the road surface Sr when foreign
matter is dispersed thereon, and the like.

The map generation unit 85 acquires image data from the
camera 41 via the acquisition unit 84. One example of the
acquisition of the image data IM1 shown in FIG. 4 will now
be described. For example, the map generation unit 85 cuts
out part of the image data IM1 to acquire map image dataset
IM11, which has a semicircular shape. The size of the map
image dataset IM11 cut out from the image data IM1 and the
part of the map image dataset IM11 cut out from the image
data IM1 may be set freely.

The map generation unit 85 associates the time and
position information of when and where the image data IM1
was acquired with the map image dataset IM11. The position
information is information that the positioning measurement
device 61 acquires at the time the image data IM1 is
acquired. The map generation unit 85 associates the position
information with coordinates CP1. Coordinates CP1 repre-
sent the optical axis position of the camera 41 in a coordinate
system indicating positions of pixels in the map image
dataset IM11. The coordinate system indicating pixel posi-
tions of the map image dataset IM11 is an image coordinate
system. The image coordinate system is a two-dimensional
orthogonal system indicating pixel positions of the image
data IM1. A pixel position of the image data IM1 may be
expressed by a coordinate indicating the transverse position
of a pixel and a coordinate indicating the longitudinal
position of the pixel. The map image dataset IM11 is
generated by cutting out part of the image data IM1. Thus,
the pixel positions of the map image dataset IM11 can be
expressed with an image coordinate system. Coordinates
CP1 in the image coordinate system coincide with the center
coordinates of the image data IM1 before the map image
dataset IM11 is cut out. When the map image dataset IM11
is semicircular, the coordinates at the center of the chord are
coordinates CP1.

The map generation unit 85 associates a pixel scale with
the map image dataset IM11. The pixel scale is the actual
size of each pixel. The map generation unit 85 associates the
map image dataset IM11 with an image number. The image
number is assigned to the image-capturing time or each map
image dataset IM11. The map generation unit 85 associates
the position information, the pixel scale, the image-captur-
ing time, and the image number to the map image dataset
IM11 to generate the map dataset M1.

Figure 5:
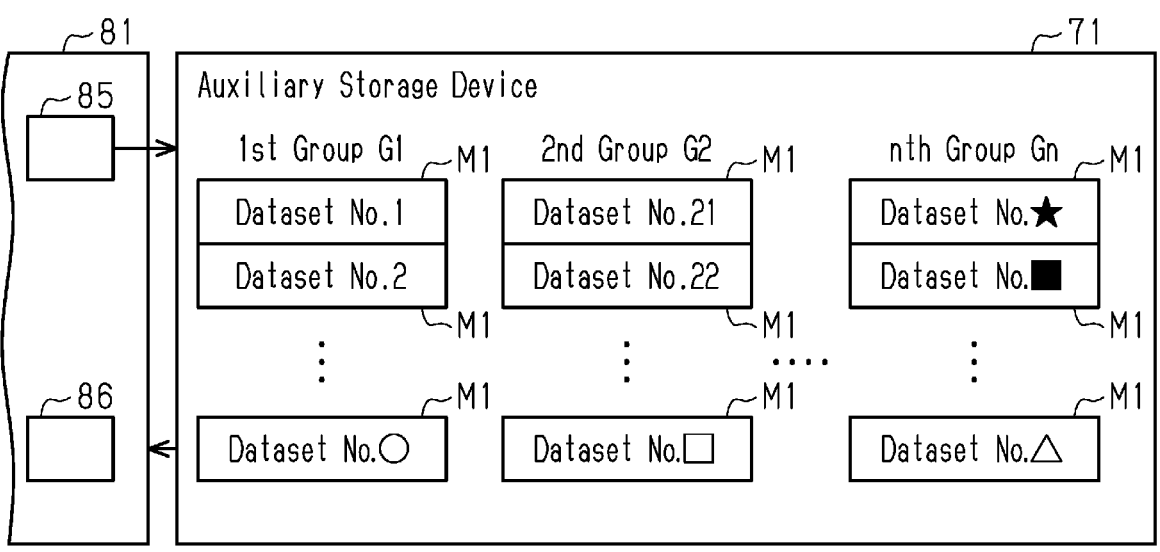
FIG. 5 is a diagram illustrating a map extraction process executed by the controller of FIG. 2.

As shown in FIG. 5, the map datasets M1 generated by the
map generation unit 85 are all stored in the auxiliary storage
device 71. Every map datasets M1 stored in the auxiliary storage device 71 is sorted into one of groups G1, G2, . . . , Gn in accordance with the state of the road surface Sr. Each of groups G1, G2, . . . , Gn includes a plurality of the map datasets M1.

The controller 81 uses the map datasets M1 to estimate the position of the autonomous vehicle 10 and control the travel motor driver 22 and the steering motor driver 32. The controller 81 controls the autonomous vehicle 10 so that the autonomous vehicle 10 travels to its destination. The autonomous vehicle 10 travels while estimating its own position. The destination may be set by the user of the autonomous vehicle 10 or by an upper-rank controller that controls the autonomous vehicle 10.

Processes Executed by Controller

The controller 81 serves as a processor that executes processes for estimating the position of the autonomous vehicle 10.

Figure 3:
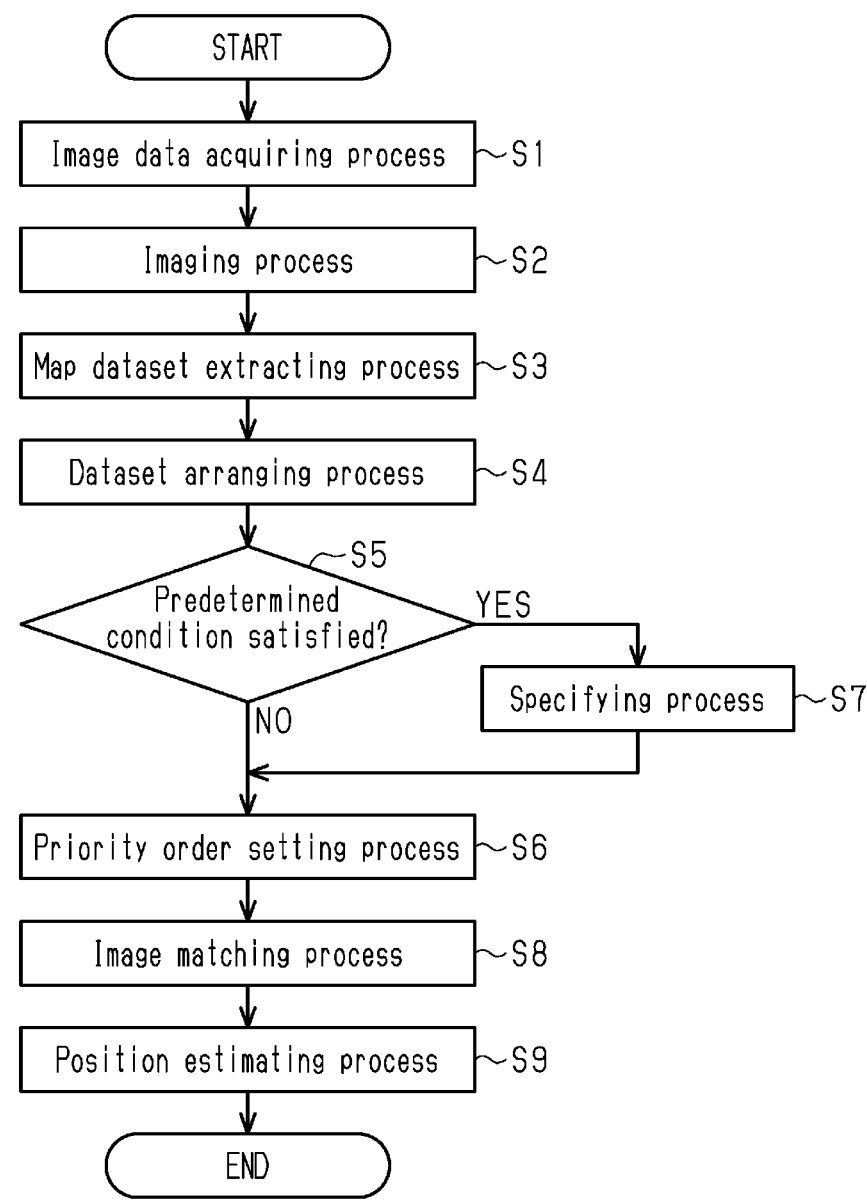
FIG. 3 is a flowchart illustrating a process executed by a controller of the autonomous vehicle illustrated in FIG. 2.

As shown in FIG. 3, the controller 81 executes an image data acquiring process S1, an imaging process S2, and a map dataset extracting process S3. The controller 81 executes a dataset arranging process S4, a determining process S5, a priority order setting process S6, and a specifying process S7. The controller 81 executes an image matching process S8 and a position estimating process S9. In the present embodiment, processes S1 to S9 are for estimating the position of the autonomous vehicle 10. Processes S1 to S9 are executed within a predetermined time after the camera 41 captures an image and before the camera 41 captures an image next. Processes S1 to S9 are executed as a routine within the predetermined time. Processes S1, S2, S3, S4, S5, S6, S8, and S9 are always executed within the predetermined time. The specifying process S7 is executed only when a predetermined condition is satisfied during the determining process S5. The image matching process S8 and the position estimating process S9 are executed by the position estimation unit 86.

The position estimation unit 86 may execute the dataset arranging process S4, the determining process S5, the priority order setting process S6, and the specifying process S7. In addition to the position estimation unit 86, the controller 81 may include functional elements that execute the dataset arranging process S4, the determining process S5, the priority order setting process S6, and the specifying process S7. The autonomous vehicle 10 may include a functional element that is a device separate from the controller 81 to execute the dataset arranging process S4, the determining process S5, the priority order setting process S6, and the specifying process S7. When the autonomous vehicle 10 includes a functional element that is a device separate from the controller 81 to execute processes S4, S5, S6, and S7, the controller 81 and the separate device form the processor.

In the autonomous vehicle 10, a case in which the position estimation unit 86 is separate from the controller 81 and the functional element that executes processes S4, S5, S6, and S7 is separate from the controller 81 will now be described. In this case, a device that has the functionality of the position estimation unit 86 and a device that has the functionalities of processes S4, S5, S6, and S7 may form the processor. A device that has the functionality for executing processes S4, S5, S6, and S7 may form the processor. When a device that has the functionality for executing processes S4, S5, S6, and S7 forms the processor, processes S4, S5, S6, and S7 are executed to estimate the position of the autonomous vehicle 10. When a device that has the functionality for executing processes S4, S5, S6, and S7 forms the processor, the processing result of the processor is output to the device that has the functionality of the position estimation unit 86. The position estimation unit 86 executes processes S8 and S9 based on the processing result.

The routine executed by the controller 81 when the controller 81 is the processor will now be described.

In the image data acquiring process S1, the controller 81 acquires image data from the camera 41 with the acquisition unit 84. In the description hereafter, the image data acquiring process S1 acquires image data IM2, which is shown in FIG. 4. The image data IM2 shown in FIG. 4 appears to be the same as the image data IM1 but differs from the image data IM1 in the position of features B. The controller 81 executes the imaging process S2 after executing the image data acquiring process S1.

As shown in FIG. 4, in the imaging process S2, the controller 81 cuts out part of the image data IM2 to acquire cut-out image data IM12. The controller 81 cuts out the same range as the map image dataset IM11 from the image data IM2 to acquire the cut-out image data IM12. Pixel positions in the cut-out image data IM12 are indicated by coordinates in the image coordinate system. Pixel positions in the map image dataset IM11 may be indicated using the same coordinate system as the pixel positions in the cut-out image data IM12. For example, coordinates CP1 at the chord center of the map image dataset IM11 and coordinates CP2 at the chord center of the cut-out image data IM12 may be expressed by the same coordinates. The controller 81 executes the map dataset extracting process S3 after executing the imaging process S2.

As shown in FIG. 3, in the map dataset extracting process S3, the controller 81 extracts only a specified number of the map datasets M1 from among all of the map datasets M1 stored in the auxiliary storage device 71. The specified number is set in advance so that a plurality of the map datasets M1 can be extracted from the map datasets M1 included in each of groups G1, G2, . . . , Gn. The specified number is less than the number of all of the map datasets M1 stored in the auxiliary storage device 71. The controller 81 executes the dataset arranging process S4 after executing the map dataset extracting process S3. In the map dataset extracting process S3, all of the map datasets M1 may be extracted from the auxiliary storage device 71.

Figure 6:
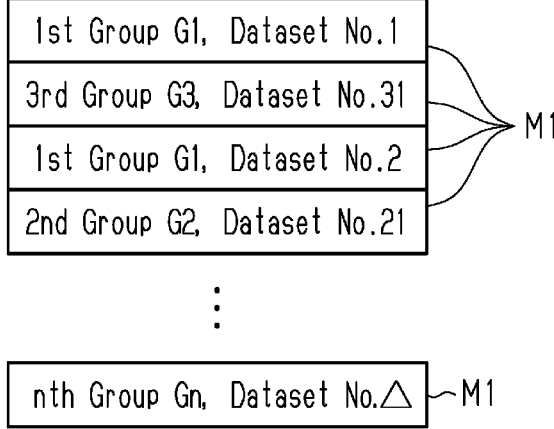
FIG. 6 is a diagram illustrating a dataset arranging process executed by the controller of FIG. 2.

As shown in FIG. 6, the dataset arranging process S4 is a process for changing the arrangement of the map datasets M1 to a predetermined arrangement order. In the dataset arranging process S4, the controller 81 changes the arrangement of the extracted map datasets M1 to a predetermined arrangement order. The predetermined order is an order of the map datasets from those having position information of a position closer to the position in the position information associated with the map image dataset that was specified in the routine executed before the present routine, that is, during the image matching process S8 of the preceding routine. In the description hereafter, the routine executed before the present routine will be referred to as the preceding routine.

More specifically, in the dataset arranging process S4, the controller 81 compares first coordinate information and second coordinate information to obtain the distance therebetween. The first coordinate information is coordinate information included in the position information associated with the map image dataset that was specified in the image matching process S8 during the preceding routine. The second coordinate information is coordinate information included in the position information associated with the map image dataset IM11 in each of the map datasets M1. The controller 81 changes the arrangement order of the map datasets M1 in accordance with the distance between the first coordinate information and the second coordinate information. The map datasets M1 closer to the head of the arrangement order include second coordinate information indicating a smaller distance to the first coordinate information. The controller 81 executes the determining process S5 after executing the dataset arranging process S4.

In the determining process S5, the controller 81 determines whether a predetermined condition is satisfied. In the present embodiment, the predetermined condition is in that the autonomous vehicle 10 and the controller 81 are being activated or in that a matching number in the image matching process S8 executed during the preceding routine was less than or equal to a threshold value. In a state in which the autonomous vehicle 10 and the controller 81 are being activated, the autonomous vehicle 10 and the controller 81 will be executing the routine for the first time subsequent to activation.

In the determining process S5, when determining that the predetermined condition is not satisfied (determining process S5: NO), the controller 81 proceeds to the priority order setting process S6. In the determining process S5, when determining that the predetermined condition is satisfied (determining process S5: YES), the controller 81 proceeds to the specifying process S7.

Figure 7:
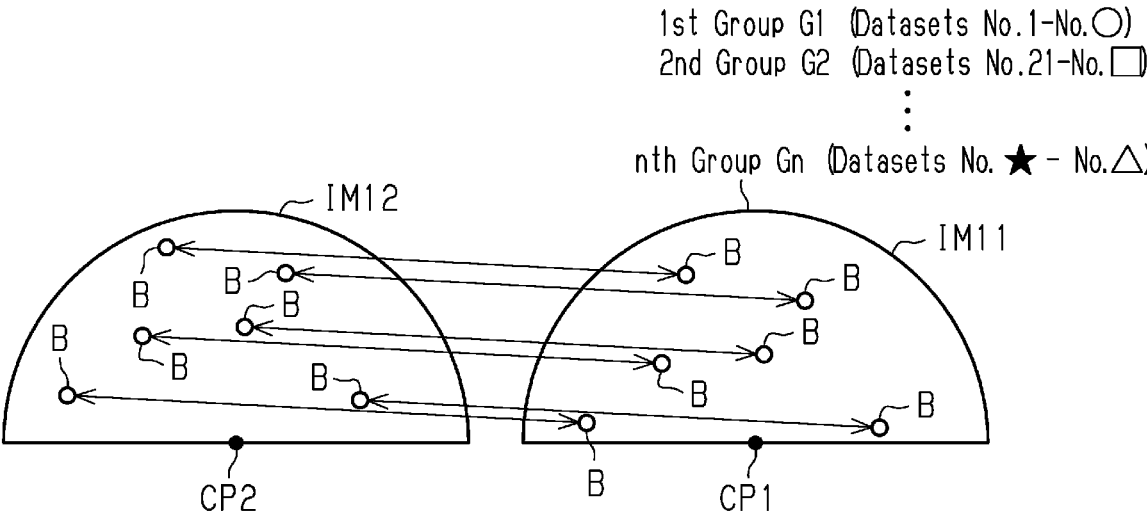
FIG. 7 is a diagram illustrating a specifying process executed by the controller of FIG. 2.

As shown in FIG. 7, in the specifying process S7, the controller 81 compares the image data IM2 with the map image dataset IM11 included in the extracted specified number of the map datasets M1. In the specifying process S7, the controller 81 compares the image data IM2 with the extracted map image datasets IM11 belonging to each of groups G1, G2, . . . , Gn. In the present embodiment, the controller 81 matches the cut-out image data IM12 used in the present routine with the map image datasets IM11 included in the extracted specified number of the map datasets M1. One example of the map image dataset IM11 including features B such as those shown in FIG. 7 is data belonging to the second group G2. The map image datasets IM11 that are extracted all differ from one another in the positions of features B.

The controller 81 extracts one or more feature points from the cut-out image data IM12. The controller 81 calculates the feature amount of each extracted feature point. The feature amount may be, for example, a feature amount vector or a luminance value. The controller 81 extracts one or more feature points from the extracted map image datasets IM11 and calculates the feature amount of each extracted feature point.

The controller 81 matches the feature points and feature amounts acquired from the cut-out image data IM12 with the feature points and feature amounts acquired from each extracted map image dataset IM11. The matching is performed by using feature amount descriptors. A feature amount descriptor may be, for example, Oriented FAST and Rotated BRIEF (ORB), Scale-Invariant Feature Transform (SIFT), or Speeded Up Robust Features (SURF).

The controller 81 searches for pairs of the feature points having similar feature amounts between the cut-out image data IM12 and extracted map image datasets IM11. From the map image datasets IM11, the controller 81 specifies the map image dataset IM11 having the greatest number of feature points paired with the feature points of the cut-out image data IM12, that is, the map image dataset IM11 having the greatest matching number. Such matching is performed to specify the map image dataset IM11 with a pattern of features B that is the same as or similar to a pattern of features B of the cut-out image data IM12.

As shown in FIG. 7, in the present embodiment, features B included in the cut-out image data IM12 match features B included in one of the map image datasets IM11 in the second group G2. Thus, the controller 81 specifies one of the map image datasets IM11 in the second group G2 as the data that is the most similar to the image data IM2.

The controller 81 specifies the group including the map image dataset IM11 specified as the map image dataset that is the most similar to the image data IM2 in the specifying process S7 as the specified group. As shown in FIG. 7, in the present embodiment, the specifying process S7 specifies the second group G2 as the specified group. The controller 81 stores the specified group in the storage 83 and then executes the priority order setting process S6.

Figure 8:
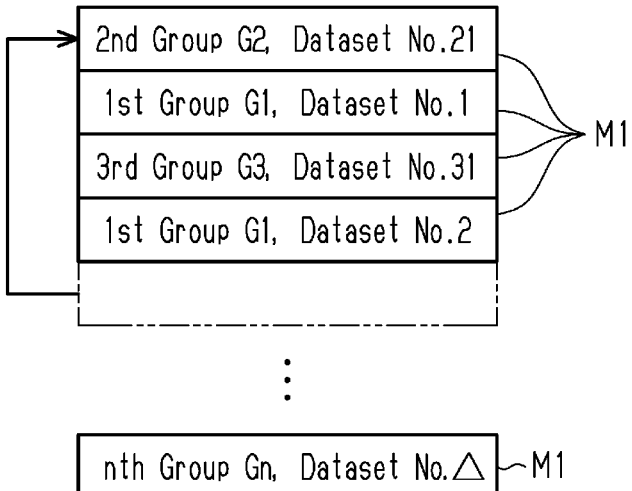
FIG. 8 is a diagram illustrating a priority order setting process executed by the controller of FIG. 2.

As shown in FIGS. 6 and 8, in the priority order setting process S6, the controller 81 further changes the arrangement order of the map datasets M1 that was changed by the dataset arranging process S4 in accordance with the result of the specifying process S7.

In the priority order setting process S6 executed after a YES determination is given in the determining process S5, the controller 81 further changes the arrangement order of the map datasets M1, which was changed by the dataset arranging process S4, in accordance with the result of the specifying process S7 by referring to the storage 83 for the result of the specifying process S7 executed in the present routine.

In the priority order setting process S6 executed after a NO determination is given in the determining process S5, the controller 81 further changes the arrangement order of the map datasets M1, which was changed by the dataset arranging process S4, in accordance with the result of the specifying process S7 by referring to the storage 83 for the result of the specifying process S7 executed in the preceding routine.

Changing the arrangement order in accordance with the result of the specifying process S7 is to change the arrangement order so that the map datasets M1 belonging to the specified group, which is specified in the specifying process S7, comes to the head. In the present embodiment, in the priority order setting process S6, the controller 81 changes the arrangement order so that among a predetermined number of the map datasets M1 from the head of the arrangement order, the map datasets M1 belonging to the second group G2 are brought to the head of the arrangement order. In the present embodiment, the predetermined number is 4. The predetermined number is set by checking in advance that the map image dataset IM11 will always be in the same image-capturing environment as the image data IM2 when observing the predetermined number of the map datasets M1 from the head of the arrangement order after the dataset arranging process S4. The controller 81 executes the image matching process S8 after executing the priority order setting process S6. The predetermined number may be changed.

Figures 9, 10:
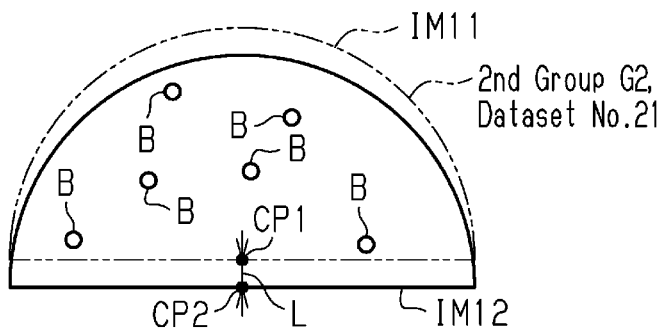
FIG. 9 is a diagram illustrating an image matching process executed by the controller of FIG. 2.
FIG. 10 is a diagram illustrating a position estimating process executed by the controller of FIG. 2.

As shown in FIG. 9, after the priority order setting process S6, the controller 81 executes the image matching process S8 on only the predetermined number of the map datasets M1 from the head of the arrangement order. In the image matching process S8, the controller 81 matches each map image dataset IM11 with the cut-out image data IM12 in order from the head of the arrangement order. The matching procedures are the same as the matching procedures in the specifying process S7.

In the image matching process S8, the controller 81 specifies the map image dataset IM11 in which the number of feature points paired with the feature points of the cut-out image data IM12 becomes greater than or equal to the threshold value. In other words, in the image matching process S8, the controller 81 specifies the map image dataset IM11 in which the number of matches with the cut-out image data IM12 becomes greater than or equal to the threshold value. The controller 81 specifies the map image dataset IM11 at the point of time in which the number of pairs becomes greater than or equal to the threshold value as the map image dataset IM11 corresponding to the image data IM2. The image matching process S8 is a process for specifying the map image dataset IM11 corresponding to the image data IM2 by comparing the image data IM2 with the map image datasets IM11 in order from the head of the arrangement order.

In the present embodiment, the image matching process S8 gives priority to use of the map datasets M1 belonging to the second group G2, which is the specified group, over the map datasets M1 belonging to the other groups G1, G3, . . ., Gn. Thus, the priority order setting process S6 is a process for further changing the arrangement order of the map datasets M1 that has been changed by the dataset arranging process S4 so that the map datasets M1 belonging to the specified group are given priority for use in the image matching process S8. In the image matching process S8, the number of the feature points in the cut-out image data IM12 matched with the feature points in the map image dataset IM11 is stored in the storage 83.

The matching number stored in the storage 83 is used in the determining process S5 of the next routine. In the determining process S5, when the matching number is less than or equal to the threshold value, the image-capturing environment of the cut-out image data IM12 used in the preceding image matching process S8 differs from the image-capturing environment of the specified map image dataset IM11. The threshold value used in the determining process S5 is a numerical value indicating that the image-capturing environment of the image data IM2 differs from the image-capturing environment of the map image dataset IM11 specified in the preceding image matching process S8.

As shown in FIG. 9, features B included in the cut-out image data IM12 coincide with features B included in one of the map image datasets IM11 in the second group G2. Thus, the controller 81 specifies one of the map image datasets IM11 included in the second group G2 as the map image dataset IM11 corresponding to the image data IM2. The controller 81 executes the position estimating process S9 after executing the image matching process S8.

As shown in FIG. 10, in the position estimating process S9, the controller 81 estimates its own position based on the map image dataset IM11 specified by the image matching process S8. The position includes the coordinates of the autonomous vehicle 10 in a geographical coordinate system and the orientation of the autonomous vehicle 10.

The controller 81 calculates the relative positional relationship of the map image dataset IM11 specified in the image matching process S8 and the cut-out image data IM12. The relative positional relationship of the specified map image dataset IM11 and the cut-out image data IM12 may be referred to as the relative positional information of the specified map image dataset IM11 and the image data IM2.

FIG. 10 shows the relative positional relationship of the specified map image dataset IM11 and the cut-out image data IM12. In the present embodiment, when the specified map image dataset IM11 is overlapped with the cut-out image data IM12 so that the feature points overlap one over the other, coordinates CP1 are separated from coordinates CP2 by distance L. Distance L is a dimension in the image coordinate system. The controller 81 converts distance L in the image coordinate system into distance in the geographical coordinate system by using a pixel scale associated with the specified map image dataset IM11. The controller 81 recognizes the distance converted in the geographical coordinate system as the relative positional relationship of the map image dataset IM11 and the cut-out image data IM12.

The controller 81 calculates the relative angle of the map image dataset IM11 specified in the image matching process S8 and the cut-out image data IM12. The relative angle of the map image dataset IM11 and the cut-out image data IM12 may be referred to as the relative angle of the specified map image dataset IM11 and the image data IM2.

The relative angle of the map image dataset IM11 and the cut-out image data IM12 is the deviation angle of the specified map image dataset IM11 and the cut-out image data IM12. The orientation of the autonomous vehicle 10 at the point of time the specified map image dataset IM11 is acquired differs from that at the point of time the cut-out image data IM12 is acquired. The difference in the orientation of the autonomous vehicle 10 results in the cut-out image data IM12 being obtained by rotating the specified map image dataset IM11. The deviation angle resulting from the rotation is the relative angle of the specified map image dataset IM11 and the cut-out image data IM12. In the present embodiment, the feature points of the specified map image dataset IM11 coincide with the feature points of the cut-out image data IM12. FIG. 10 shows one example of when the relative angle of the specified map image dataset IM11 and the cut-out image data IM12 is 0.

The controller 81 estimates its own position based on the position information, the relative positional relationship, and the relative angle that are associated with the specified map image dataset IM11. The controller 81 shifts the coordinate information associated with the specified map image dataset IM11 in accordance with coordinates corresponding to the relative relationship. The controller 81 shifts the orientation information associated with the specified map image dataset IM11 by an amount corresponding to the relative angle. The controller 81 determines its own position using the coordinates in the geographical coordinate system and the orientation. The controller 81 ends processing after executing the position estimating process S9.

Operation of Present Embodiment

The operation of the present embodiment will now be described.

In the specifying process S7, the controller 81 specifies the map dataset M1 of which the image-capturing environment is similar to that of the image data IM2 used in the image matching process S8. In the priority order setting process S6, the controller 81 uses the similarity to the image-capturing environment of the image data IM2 as a determination criterion to change the arrangement order of the map datasets M1 subsequent to the dataset arranging process S4. This allows the controller 81 to easily compare the image data IM2, in the image matching process S8, with the map image dataset IM11 of the image-capturing environment that is the most similar to the image-capturing environment of the image data IM2.

The image matching process S8 is executed on only the predetermined number of the map datasets M1 of which the arrangement was changed in the dataset arranging process S4. Thus, the processing time of the image matching process S8 is shorter than when the map image datasets IM11 are all compared with the image data IM2.

Advantages of Present Embodiment

The advantages of the present embodiment will now be described.

(1) The specifying process S7 and the priority order setting process S6 are executed so that the image matching process S8 uses the map image dataset IM11 of the image-capturing environment that is the most similar to the image-capturing environment of the image data IM2. This improves the accuracy for estimating the position of the autonomous vehicle 10. Further, in the image matching process S8, there is no need to use every one of the map image datasets IM11. This shortens the processing time of the image matching process S8. Thus, the processing time of the image matching process S8 is reduced, and the position estimation accuracy is improved.

(2) In the map dataset extracting process S3, the specified number of the map datasets M1 is extracted. Thus, the specifying process S7 does not use every one of the map image datasets IM11 stored in the auxiliary storage device 71. This shortens the processing time of the routine executed by the controller 81 of the autonomous vehicle 10 in addition to shortening the processing time of the image matching process S8.

(3) The determining process S5 decreases the frequency of execution of the specifying process S7. This reduces the processing load on the controller 81.

Modified Examples

The present embodiment may be modified as described below. The present embodiment and the following modifications can be combined as long as there is no technical contradiction.

In the specifying process S7, the specified group is not limited to the second group G2. For example, if the first group G1 is the group that includes the map image datasets IM11 of which the image-capturing environment is the same as the image data IM2, the first group G1 is specified as the specified group. The group specified in the specifying process S7 is changed in accordance with the image-capturing environment of the image data IM2.

In an example similar to the above embodiment, in the priority order setting process S6, the controller 81 may change the arrangement order of the map datasets M1 that was changed in the dataset arranging process S4 so that among a predetermined number of the map datasets M1 from the head of the order, the map datasets M1 belonging to the second group G2 are arranged to be second from the head of the arrangement order. In the priority order setting process S6, the controller 81 may change the arrangement order of the map datasets M1 that was changed in the dataset arranging process S4 so that among a predetermined number of the map datasets M1 from the head of the order, the map datasets M1 belonging to the specified group are arranged close to the head of the order.

The map datasets M1 belonging to the specified group may be arranged in the priority order setting process S6 to be third from the head of the arrangement order after the dataset arranging process S4. When the predetermined number is changed to 5, the map datasets M1 belonging to the specified group may be arranged in the priority order setting process S6 to be fourth from the head of the arrangement order after the dataset arranging process S4. That is, the priority order setting process S6 is a process that changes, among the predetermined number of the map datasets M1 from the head of the arrangement order, the map datasets M1 belonging to the specified group to a higher order than the order before execution of the priority order setting process S6. In other words, the priority order setting process S6 is a process that further changes the arrangement order of the map datasets M1 that has been changed by the dataset arranging process S4 so that the map datasets M1 belonging to the specified group are given priority for use in the image matching process S8.

In the present embodiment, in the map datasets M1 of which the arrangement order was changed in the dataset arranging process S4, there is only one map dataset M1 belonging to the specified group in the predetermined number from the head of the arrangement order. This, however, is not a limitation. For example, the predetermined number may be determined so that there are a plurality of the map datasets M1 belonging to the specified group in the predetermined number from the head of the arrangement order. In this case, in the priority order setting process S6, the controller 81 may change the arrangement order so that the map datasets M1 belonging to the specified group included in the predetermined number are all arranged at a higher order than before the priority order setting process S6 was executed.

The specified number may be, for example, changed to any number as long as it does not coincide with the number of all of the map datasets M1 stored in the auxiliary storage device 71. As a result of such a change, the predetermined number of the map datasets M1 from the head of the arrangement order after the dataset arranging process S4 may not include a map image dataset IM11 that was captured in the same image-capturing environment as the image data IM2. In this case, the controller 81 may repeat the map dataset extracting process S3 until the predetermined number of the map datasets M1 from the head of the arrangement order includes a map image dataset IM11 that was captured in the same image-capturing environment as the image data IM2.

The map image dataset IM11 does not have to be data that is cut out from the image data IM1. The map image dataset IM11 may be changed to dataset that is circular. As a result of such a change, the imaging process S2, which cuts out the image data IM2 to acquire the cut-out image data IM12, may be omitted from the routine. In such a case, in the specifying process S7 and the image matching process S8, the controller 81 matches the circular map image dataset IM11 with the image data IM2. That is, in the specifying process S7 and the image matching process S8, the controller 81 may directly compare the circular map image dataset IM11 with the image data IM2.

The position information does not have to be included in the map image dataset IM11 as long as it is associated with the coordinates indicating the optical axis position of the camera 41 in the image coordinate system. That is, the coordinates indicating the optical axis position of the camera 41 in the image coordinate system may be excluded from the rage of the map image dataset IM11.

The storage device storing the map datasets M1 may be the storage 83.

The coordinate system indicating a pixel position of the map image dataset IM11 and the coordinate system indicating a pixel position of the image data IM2 may be different coordinate systems.

The controller 81 does not have to include the map generation unit 85. That is, the controller 81 does not have to include the functionality for generating the map datasets M1. For example, when there is more than one autonomous vehicle 10, one autonomous vehicle 10 may generate the map datasets M1. Then, the map datasets M1 may be copied and used by the other autonomous vehicles 10.

In the above embodiment, the camera 41 may be arranged at a location other than the bottom of the vehicle body 11 as long as it can be oriented in the vertical direction.

The image-captured subject of the camera 41 is not limited to the road surface Sr. The image-captured subject of the camera 41 may be changed to a construction or the like located near the autonomous vehicle 10. In this case, the camera 41 may be oriented, for example, toward the front or the rear of the autonomous vehicle 10. The map datasets M1 stored in the storage device are generated for each state of the construction, which is the image-capturing subject. The state of the construction is, for example, the state of irregularities in the outer wall of the construction during rainfall, the state of the irregularities in the outer wall of the construction under clear skies, the state of equipment attached to the outer wall of the construction, and the like.

In the above embodiment, processes S1 to S9 do not have to be included in a routine executed within a predetermined time. For example, processes S1 to S7 may be included in a routine performed within a predetermined time. When making such a change, processes S8 and S9 are changed to be executed between the present routine and a routine following the present routine. In this case, the image matching process S8 is performed only once after each routine. That is, the image matching process S8 is performed only once for each of the image datasets captured by the camera 41. In other words, the image matching process S8 is performed in predetermined time intervals.

The dataset arranging process S4 may be a process that changes the arrangement order so that the map datasets M1 with the map image dataset IM11 included in a predetermined range about the position information associated with the map image data specified in the image matching process S8 of the preceding routine are arranged closer to the head of the arrangement order.

Figure 11:
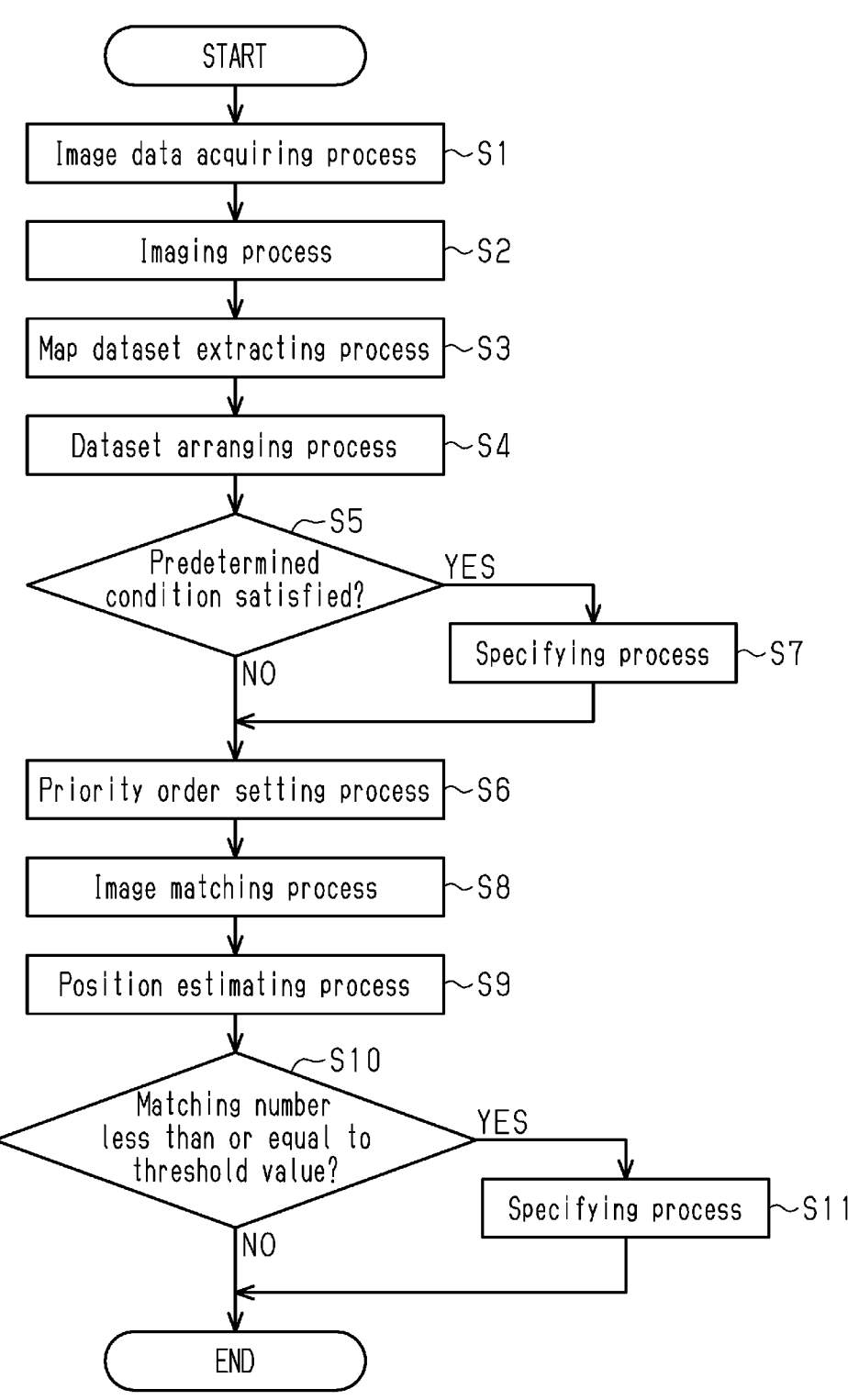
FIG. 11 is a flowchart illustrating a process executed by the autonomous vehicle in a modified example.

As shown in FIG. 11, a second determining process S10 and a specifying process S11 may be added after the position estimating process S9. In the second determining process S10, the controller 81 determines whether the matching number stored in the storage 83 during the image matching process S8 is less than or equal to the threshold value. The second determining process S10 uses the same threshold value as the determining process S5. When a YES determination is given in the second determining process S10, the controller 81 proceeds to the specifying process S11. When a NO determination is given in the second determining process S10, the controller 81 ends the routine. The specifying process S11 is the same as the specifying process S7.

The specifying process S11 is executed after the image matching process S8 so that, for example, when an event that changes the image-capturing environment occurs before and after the image matching process S8, the specified group can be updated readily.

In the determining process S5, the predetermined condition is satisfied, for example, after the autonomous vehicle 10 and the controller 81 are activated whenever a predetermined time elapses. Further, in the determining process S5, the predetermined condition is satisfied, for example, each time the autonomous vehicle 10 travels a predetermined specified distance. That is, the predetermined condition may be set to allow changes in the environment of the traveling autonomous vehicle 10 to be checked periodically. In other words, the predetermined condition may include an event indicating a change in the environment of the traveling autonomous vehicle from when the preceding image matching process was executed.

Figure 12:
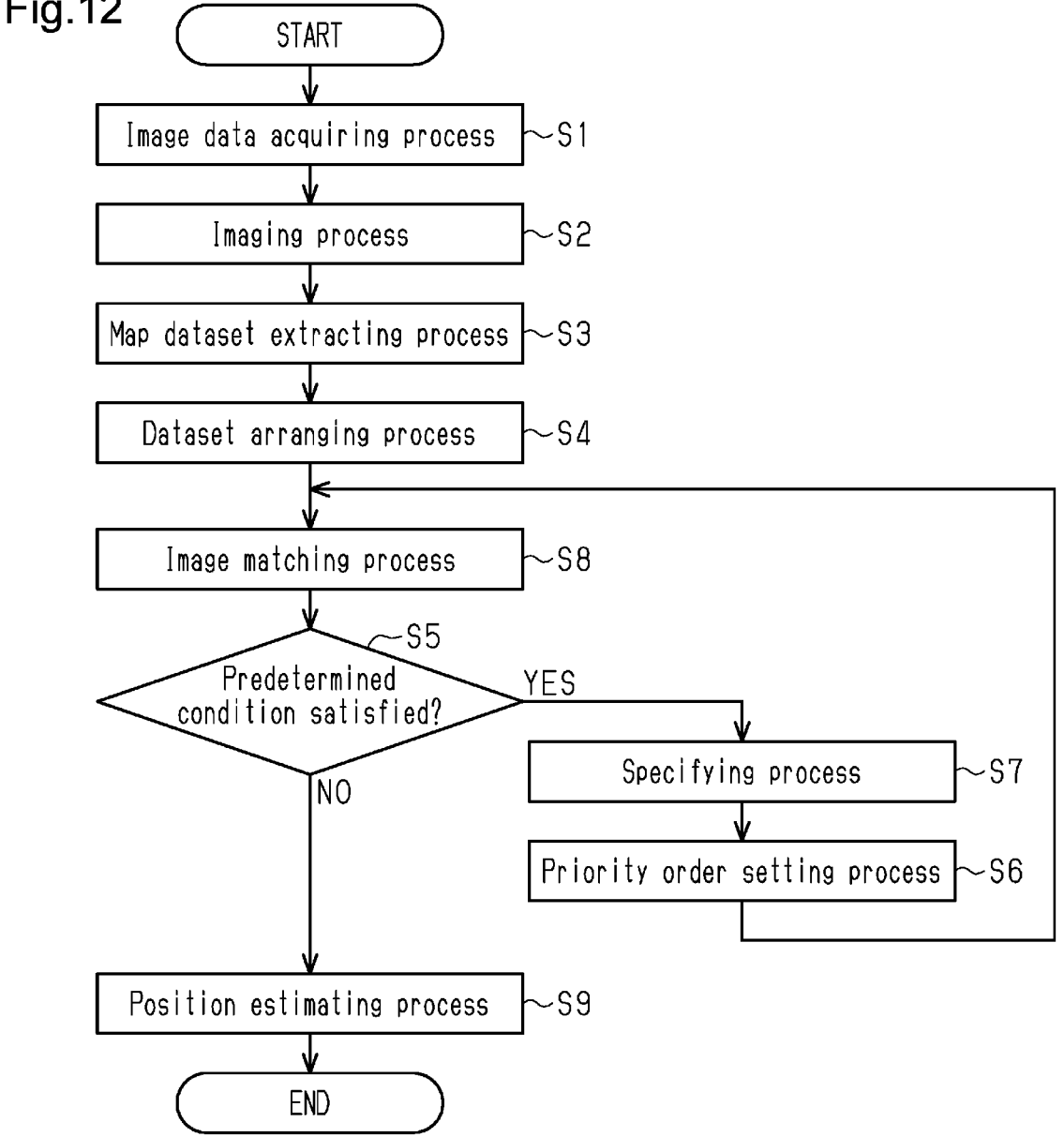
FIG. 12 is a flowchart illustrating a process executed by the autonomous vehicle in a modified example.

As shown in FIG. 12, in the routine executed by the controller 81, the image matching process S8 may be performed after the dataset arranging process S4, and processes S5, S6, and S7 may be performed after the image matching process S8.

The image matching process S8 that is executed for the first time in the present routine is executed on only a predetermined number of the map datasets M1 from the head of the arrangement order after the dataset arranging process S4. The determining process S5 is executed after the image matching process S8.

When a NO determination is given in the determining process S5, the controller 81 proceeds to the position estimating process S9. When a YES determination is given in the determining process S5, the controller 81 executes the specifying process S7 and the priority order setting process S6 and then executes the image matching process S8 again.

When the image matching process S8 is performed for the second time after the priority order setting process S6, a state in which the autonomous vehicle 10 and the controller 81 are being activated is omitted from the predetermined condition.

The invention claimed is:

1. An autonomous vehicle configured to travel while estimating its own position, the autonomous vehicle comprising:

a camera configured to image-capture an imaging subject in predetermined time intervals;

a storage configured to store map datasets including position information associated with map image datasets acquired by image-capturing the imaging subject in advance;

an acquisition circuit configured to acquire image data from the camera;

a position estimation circuit configured to execute, in the predetermined intervals, an image matching process that compares the image data with the map image datasets to specify a map image dataset corresponding to the image data and configured to execute a position estimating process that estimates the position of the autonomous vehicle from a relative positional relationship of the specified map image dataset and the image data and from a relative angle of the specified map image dataset and the image data; and a processor, wherein the map datasets are divided into groups in accordance with a state of the imaging subject, the processor is configured to execute a dataset arranging process for changing an arrangement order of the map datasets to a predetermined arrangement order, a specifying process for comparing the image data with the map image datasets included in each of the groups when a predetermined condition is satisfied subsequent to the dataset arranging process to specify a group including a map image dataset that is most similar to the image data as a specified group, and a priority order setting process for further changing the arrangement order of the map datasets that was changed by the dataset arranging process so that the map datasets belonging to the specified group are given priority for use in the image matching process, the image matching process includes comparing the image data with only a predetermined number of the map datasets from a head of the arrangement order subsequent to the priority order setting process and in order from the head of the arrangement order, and the processor autonomously controls a traveling motor driver and a steering motor driver of the autonomous vehicle to move the autonomous vehicle to a target location based on the position of the autonomous vehicle that is estimated.

2. The autonomous vehicle according to claim 1, wherein the predetermined arrangement order in the dataset arranging process is an order of the map datasets with the position information that is closer in distance to the position information associated with the map image dataset specified when the image matching process was previously executed.

3. The autonomous vehicle according to claim 1, wherein the predetermined condition includes an event indicating that an environment in which the autonomous vehicle is traveling may have changed from when the image matching process was previously executed.

4. The autonomous vehicle according to claim 1, wherein the specifying process includes extracting one or more feature points from the image data, and describing feature amounts of the feature points that are extracted, extracting one or more feature points from the map image datasets included in each of the groups, and calculating a feature amount of each of the feature points that are extracted, matching a feature point and a feature amount acquired from the image data with a feature point and a feature amount acquired from the map image datasets to search for a pair of the feature point of the image data and the feature point of the map image dataset having similar feature amounts, specifying a map image dataset having a greatest number of feature points paired with the feature points of the image data as a map image dataset that is the most similar to the image data, and specifying a group including the map image dataset that is specified as the specified group.

5. A controller of an autonomous vehicle, the controller is configured to control the autonomous vehicle that travels while estimating its own position, the controller comprising:

an acquisition circuit configured to acquire image data from a camera that image-captures an imaging subject in predetermined time intervals;

a position estimation circuit configured to execute, in the predetermined intervals, an image matching process that compares the image data with map image datasets, included in map datasets including position information associated with map image datasets acquired by image-capturing the imaging subject in advance, to specify a map image dataset corresponding to the image data and configured to execute a position estimating process that estimates the position of the autonomous vehicle from a relative positional relationship of the specified map image dataset and the image data and from a relative angle of the specified map image dataset and the image data; and the map datasets are divided into groups in accordance with a state of the imaging subject, the controller is configured to execute a dataset arranging process for changing an arrangement order of the map datasets to a predetermined arrangement order, a specifying process for comparing the image data with the map image datasets included in each of the groups when a predetermined condition is satisfied subsequent to the dataset arranging process to specify a group including a map image dataset that is most similar to the image data as a specified group, and a priority order setting process for further changing the arrangement order of the map datasets that was changed by the dataset arranging process so that the map datasets belonging to the specified group are given priority for use in the image matching process, the image matching process includes comparing the image data with only a predetermined number of the map datasets from a head of the arrangement order subsequent to the priority order setting process and in order from the head of the arrangement order, and the controller autonomously controls a traveling motor driver and a steering motor driver of the autonomous vehicle to move the autonomous vehicle to a target location based on the position of the autonomous vehicle that is estimated.

6. A method for estimating a position of an autonomous vehicle, the method comprising:

image-capturing an imaging subject in predetermined time intervals;

storing map datasets including position information associated with map image datasets acquired by image-capturing the imaging subject in advance;

acquiring image data from a camera;

executing, in the predetermined intervals, an image matching process for comparing the image data with the map image datasets to specify a map image dataset corresponding to the image data;

executing a position estimating process for estimating the position of the autonomous vehicle from a relative positional relationship of the specified map image dataset and the image data and from a relative angle of the specified map image dataset and the image data, the map datasets are divided into groups in accordance with a state of the imaging subject;

executing a dataset arranging process for changing an arrangement order of the map datasets to a predetermined arrangement order;

executing a specifying process for comparing the image data with the map image datasets included in each of the groups when a predetermined condition is satisfied subsequent to the dataset arranging process to specify a group including a map image dataset that is most similar to the image data as a specified group;

executing a priority order setting process for further changing the arrangement order of the map datasets that has been changed by the dataset arranging process so that the map datasets belonging to the specified group are given priority for use in the image matching process, and the image matching process includes comparing the image data with only a predetermined number of the map datasets from a head of the arrangement order subsequent to the priority order setting process and in order from the head of the arrangement order; and autonomously controlling, via a processor, a traveling motor driver and a steering motor driver of the autonomous vehicle to move the autonomous vehicle to a target location based on the position of the autonomous vehicle that is estimated.

7. The autonomous vehicle according to claim 5, wherein the predetermined condition is in that the autonomous vehicle and the controller are being activated or in that a matching number in the image matching process executed during a preceding routine was less than or equal to a threshold value.

\* \* \* \* \*